(12) United States Patent
Schuster

(10) Patent No.: US 12,498,406 B2
(45) Date of Patent: Dec. 16, 2025

(54) METHOD FOR THE SELF-DIAGNOSIS OF A CIRCUIT FOR MEASURING THE INSULATION RESISTANCE OF A HIGH-VOLTAGE SYSTEM

(71) Applicant: Sensor-Technik Wiedemann GmbH, Kaufbeuren (DE)

(72) Inventor: Franz-Josef Schuster, Eggenthal (DE)

( * ) Notice: Subject to any disclaimer, the term of this patent is extended or adjusted under 35 U.S.C. 154(b) by 145 days.

(21) Appl. No.: 18/292,683

(22) PCT Filed: Jul. 15, 2022

(86) PCT No.: PCT/EP2022/069833
§ 371 (c)(1),
(2) Date: Jan. 26, 2024

(87) PCT Pub. No.: WO2023/006443
PCT Pub. Date: Feb. 2, 2023

(65) Prior Publication Data
US 2024/0345145 A1 Oct. 17, 2024

(30) Foreign Application Priority Data
Jul. 30, 2021 (DE) .................... 10 2021 119 830.5

(51) Int. Cl.
*G01R 27/02* (2006.01)
*G01R 35/00* (2006.01)

(52) U.S. Cl.
CPC .......... *G01R 27/025* (2013.01); *G01R 35/00* (2013.01)

(58) Field of Classification Search
CPC .... G01L 1/10; G01L 1/20; G01L 1/22; G01N 17/00; G01N 27/02; G01N 27/04; G01R 27/00
See application file for complete search history.

(56) References Cited

U.S. PATENT DOCUMENTS

| 9,234,943 B2 * | 1/2016 | Fabregas ............. G01R 35/005 |
| 2011/0140714 A1 * | 6/2011 | Hernando ........... G01R 27/025 324/551 |
| 2023/0204678 A1 * | 6/2023 | Izutani .................. G01R 31/52 324/76.11 |

FOREIGN PATENT DOCUMENTS

| CN | 108333548 A | 7/2018 |
| CN | 109100618 A | 12/2018 |

(Continued)

*Primary Examiner* — Tung X Nguyen
(74) *Attorney, Agent, or Firm* — Welsh Flaxman & Gitler LLC

(57) ABSTRACT

The invention relates to the self-diagnosis of a circuit for measuring the insulation resistance of a battery system, the circuit having a first switch, which connects the positive terminal of the battery system to earth via a series-connected first comparator resistor, and a second switch, which connects the negative terminal of the battery system to earth via a series-connected second comparator resistor. Current measurements are made via the closed first switch to obtain a measured first current flow and via the closed second switch to obtain a measured second current flow, wherein at any one time only one of the two switches closed, the theoretical current flow via the switches is calculated on the basis of the voltage of the battery system and the size of the comparator resistor, and the measured current flow, is compared with the associated theoretical current flow, wherein an error signal is output and/or an error action is carried out when the result of the comparison is above or below a predefined reference value range.

8 Claims, 4 Drawing Sheets

(56) References Cited

FOREIGN PATENT DOCUMENTS

| | | |
|---|---|---|
| DE | 102016122115 B3 | 4/2018 |
| KR | 20130112495 A | 10/2013 |
| KR | 20130112496 A | 10/2013 |
| WO | 2021051947 A1 | 3/2021 |
| WO | 2021085893 A1 | 5/2021 |

* cited by examiner

METHOD FOR THE SELF-DIAGNOSIS OF A CIRCUIT FOR MEASURING THE INSULATION RESISTANCE OF A HIGH-VOLTAGE SYSTEM

BACKGROUND OF THE INVENTION

The invention relates to a method for measuring the insulation of a battery-powered HV system, e.g. an HV drive system, as is used in electric vehicles. Such systems have operating voltages Us of several hundred volts. They can even be up to 1000 V and more. For safety reasons, a low-resistance connection between the HV system and earth, e.g. a housing or vehicle chassis should be recognized in good time in order to be able to initiate safety measures, e.g. to separate the battery from the drive system.

Therefore, insulation measurements are required for such systems in order to record the insulation resistance of the system, which must adhere to certain limits. Such an insulation measurement is described in ECE R100. The basic circuit diagram of such a measurement according to ECE R100 can be found in FIGS. 1 to 3 taken from Appendix 4 of ECE R100. For this purpose, the voltages between the positive busbar and earth as well as between the negative busbar and earth are recorded. Such measurements are then carried out again when a known comparator resistor is connected between the corresponding busbar and earth, which preferably corresponds to the prescribed minimum value of the insulation resistance multiplied by the operating voltage of the system.

EP 1 857 825 B1 describes a method for carrying out the insulation measurement automatically according to ECE R100. For this purpose, mechanical switches or semiconductor switches are provided, which automatically switch the comparator resistor alternately between the positive and negative busbars. A disadvantage of this method is that two switches are now integrated into the measurement, and that instead of one comparator resistor, which is switched alternately between the positive or negative busbar and earth, two identical comparator resistors must be provided, which are connected to earth through the switches. Both the switches and the provision of two identical resistances can have effects on the measurement result, which in turn affects the reliability of such an automatic measurement.

SUMMARY OF THE INVENTION

The object of the present invention is to provide a method which increases the reliability of an automated measurement of the insulation resistance. This object is achieved according to the invention by a method for the self-diagnosis of a circuit for measuring the insulation resistance of a battery system, in particular in motor vehicles. The circuit comprises a first switch, which connects the positive terminal of the battery system to earth via a series-connected first comparator resistor, and a second switch, which connects the negative terminal of the battery system to earth via a series-connected second comparator resistor. Current measurements are carried out via the closed first switch to obtain a measured first current flow and via the closed second switch to obtain a measured second current flow. At any one time only one of the two switches is closed. The theoretical current flow via the switches is calculated on the basis of the voltage of the battery system and the size of the comparator resistor. The measured current flow is compared with the associated theoretical current flow and an error signal is output and/or an error action is carried out when the comparison result is above or below a predetermined reference value range. Further advantageous aspects, details and configurations of the invention result from the dependent claims, the description and the drawings.

The method according to the invention is used for self-diagnosis of the circuit for measuring insulation resistance, in particular for checking and thus ensuring the functionality of the switches installed in this circuit as well as the comparator resistors.

The circuit for measuring insulation resistance itself contains the following components: a first switch, which connects the positive terminal of the battery system to earth via a series-connected first comparator resistor and a second switch, which connects the negative terminal of the battery system to earth via a series-connected second comparator resistor, wherein the resistance value of the two comparator resistors is identical and in particular corresponds to the prescribed minimum value of the insulation resistance multiplied by the operating voltage of the system.

In the method according to the invention, current measurements are now carried out via the closed first switch to obtain a measured first current flow and via the closed second switch to obtain a measured second current flow, wherein at any one time only one of the two switches is closed.

In addition, the theoretical current flow across the switches is calculated on the basis of the operating voltage of the system and the size of the corresponding comparator resistor. Finally, the measured current flow is compared with the associated theoretical current flow, and an error signal is output and/or an error action is carried out if the comparison result is above or below a predetermined reference value range.

In this way, on the one hand, it can be verified that the switches function safely, i.e. open and close. On the other hand, by this means it can be determined whether the two comparator resistors are in order. Thus, by means of the method according to the invention the circuit for automatic measurement of the insulation resistance can be completely checked for the functionality of its components, which improves the reliability of the measurement results of the insulation resistance measurement.

A defect of the switch could be, for example:
Switch does not close→switch is non-conductive
Excessive leakage current flows through the switch (mainly with semiconductor switches)
Switch does not switch off→switch is always conducting
A defect of the comparator resistor $R_S$ could be:
Resistance drift up→larger resistance
Resistance drift down→smaller resistance
Resistance break→infinite resistance
Short circuit Furthermore, if the current measurement is sufficiently accurate, the result of the insulation measurement can be checked for plausibility by means of this current measurement, which in turn improves the reliability of the insulation measurement itself.

In an advantageous further development of the invention, an idle current measurement is carried out in which both switches are open. An error signal is then output and/or an error action is carried out if the idle current exceeds a predetermined reference value.

If both switches are open, i.e. no switch is activated, no current should be measurable minus the measurement inaccuracies-accuracy of the current measurement and/or leakage current of the semiconductor circuit. If the measured current still exceeds the reference value, it can be concluded, for example, that the leakage current of the semiconductor switches is too high.

Preferably, the reference value range is selected such that temperature-related fluctuations of the measurement results or measured value tolerances are taken into account in order to generate an error action or an error signal only if an error-related deviation of the determined values occurs.

In a preferred embodiment of the invention, the following errors are assumed if the measured current flow falls below the predetermined reference value range:

The switch does not close correctly
The resistance value of $R_S$ is too high (drift)
The resistance of $R_S$ is high resistance (break).

Appropriate measures to correct the errors can then be initiated immediately, e.g. replacing the defective components.

In an advantageous embodiment of the invention, the following errors are assumed if the measured current flow exceeds the predetermined reference value range:

The resistance value of $R_S$ is too low (drift)
The resistor $R_S$ is low-resistance (short circuit).

With this method, specific error situations can be detected easily and quickly and reacted to accordingly.

Preferably, the voltage difference of the positive terminal of the battery system to earth as well as the voltage difference of the negative terminal of the battery system to earth are measured and the current flow is calculated as follows:

$$It1 = U_P/R_S$$

$$It2 = U_M/R_S.$$

By this means the theoretical current values can be obtained easily, which can then be used as reference values.

Preferably the values from the voltage measurement and/or the current measurement are fed to an AD converter and the signals are processed digitally in a microcontroller. In this way the entire evaluation of the signals and the storage of tolerances etc. for the evaluation of the signals, the detection of drifts etc. can be carried out more easily and in a program-controlled manner.

The following expressions are used synonymously: positive terminal-positive busbar; negative terminal-negative busbar; HV-high voltage; resistance-comparator resistor-comparison measuring resistance;

BRIEF DESCRIPTION OF THE DRAWINGS

The invention will be explained in more detail hereinafter using exemplary embodiments in connection with the drawings. In the figures.

DESCRIPTION OF THE PREFERRED EMBODIMENTS

Figure 4:
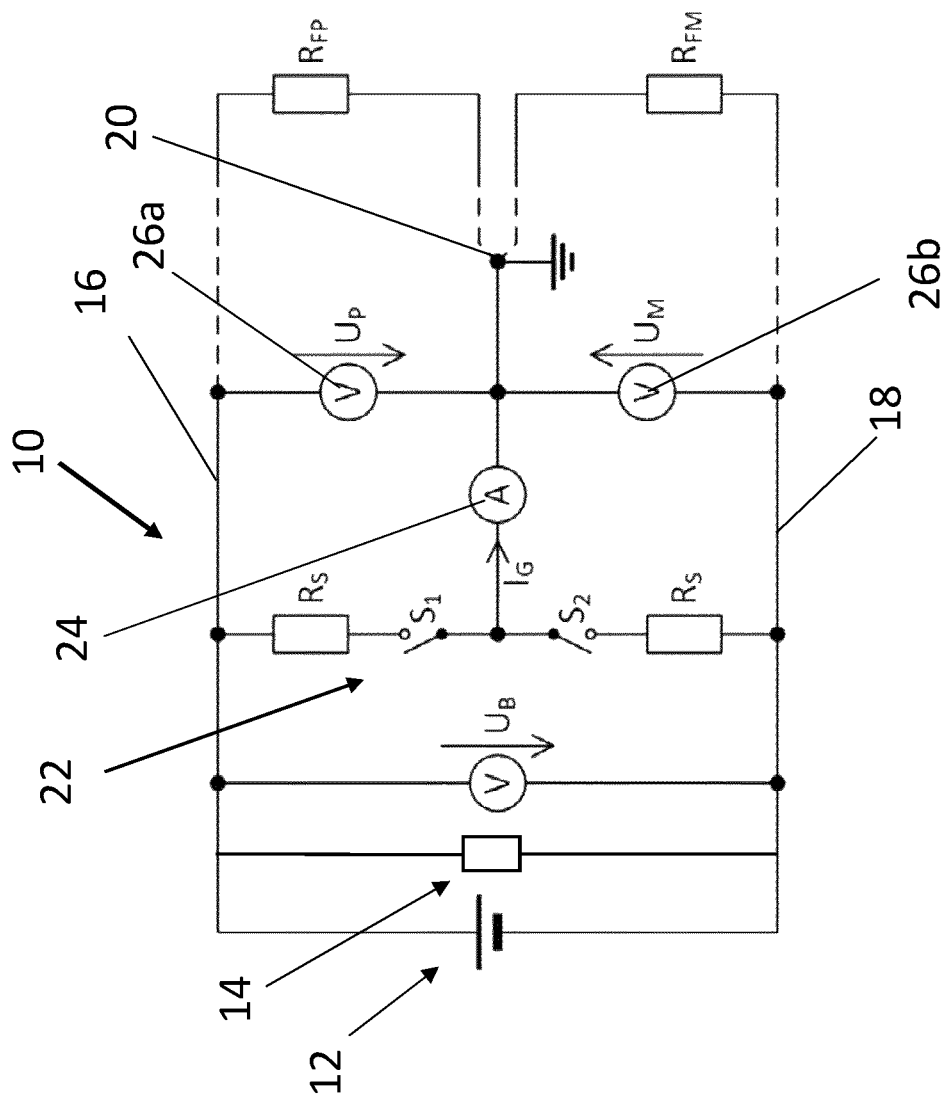
FIG. 4 shows a circuit diagram for automatically detecting the insulation resistance and for detecting the current flow for self-diagnosis of the circuit for detecting the insulation resistance.

FIG. 4 shows the equivalent circuit diagram of an HV (high-voltage) drive system 10 with an HV battery 12, in particular Li-based with an output voltage in the range of 60 to 1500 V, and a drive 14 that is supplied by the HV battery 12. Battery 12 and drive 14 are connected via a positive busbar 16 and a negative busbar 18.

For safety reasons, it is extremely important that the two busbars 16, 18 are insulated with respect to earth 20. The fault resistance Rep between earth 20 and positive busbar 16 as well as the fault resistance REM between earth 20 and negative busbar 18 must therefore be extremely high-resistance, since a low-resistance connection of the system 10 to earth 20, e.g. the chassis of a motor vehicle, can be life-threatening at the system voltages present. For safety reasons, a low-resistance connection (e.g. <100 Ohm/V) between the battery and the housing should be recognized in good time and the battery separated from the circuit.

According to the invention, all the voltage measurements necessary for measurement of the insulation resistance according to ECE R 100, are carried out via a measuring circuit 22, which consists of two identical comparator resistors $R_{S1}$, $R_{S2}$, which are connected to earth 20 in a voltage divider circuit in series with an associated switch $S_1$, $S_2$. The switches $S_1$, $S_2$ are preferably formed by semiconductor switches. The two measuring resistors $R_{S1}$, $R_{S2}$ are merely designated hereinafter as $R_S$.

By alternately opening and closing the two switches $S_1$ and $S_2$, the following can thus be recorded via voltage measuring devices 26a, b:

$U_P$, i.e. the voltage drop between the positive busbar 16 and earth 20 across $R_S$ and the switch $S_1$, wherein the voltage drop across the switch $S_1$ should be negligible and $U_N$, i.e. the voltage drop between the negative busbar 18 and earth 20 across $R_S$ and the switch $S_2$, wherein the voltage drop at the switch $S_2$ should also be negligible.

The battery voltage $U_B$ can be calculated by forming the difference between the two voltages $U_P$ and $U_M$.

It should be noted that in practice the two voltage measurements $U_P$ and $U_M$ are carried out digitally, i.e. in a known manner using an AD converter and a microcontroller.

The above voltage measurements can be used to calculate the insulation resistance using the formulae from ECE R100, wherein the internal resistance of the voltmeter must be taken into account in the calculation.

Figure 1:
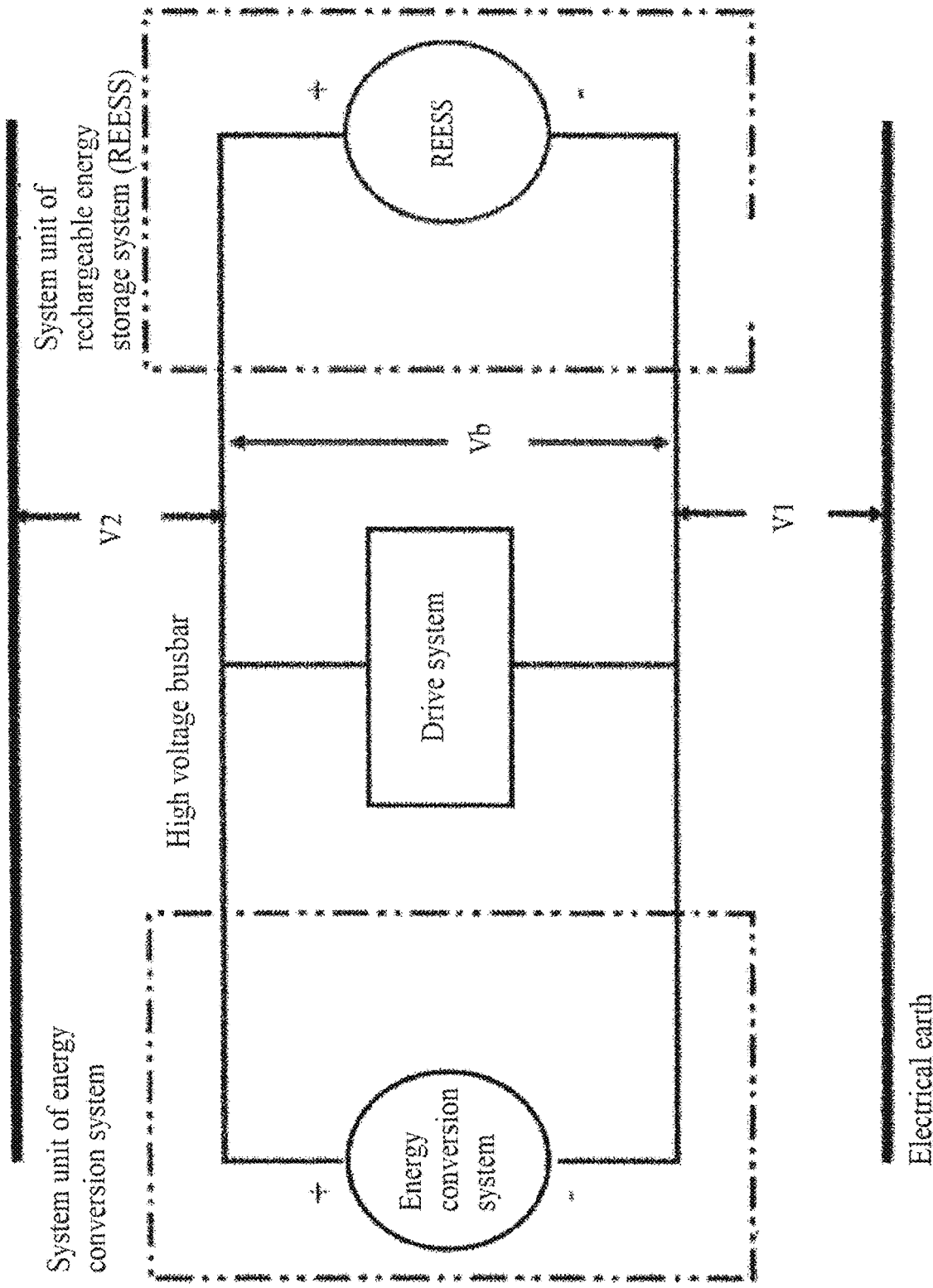
FIGS. 1 to 3 show circuit diagrams for the method for measuring the insulation resistance according to ECE R100.
Figure 2:
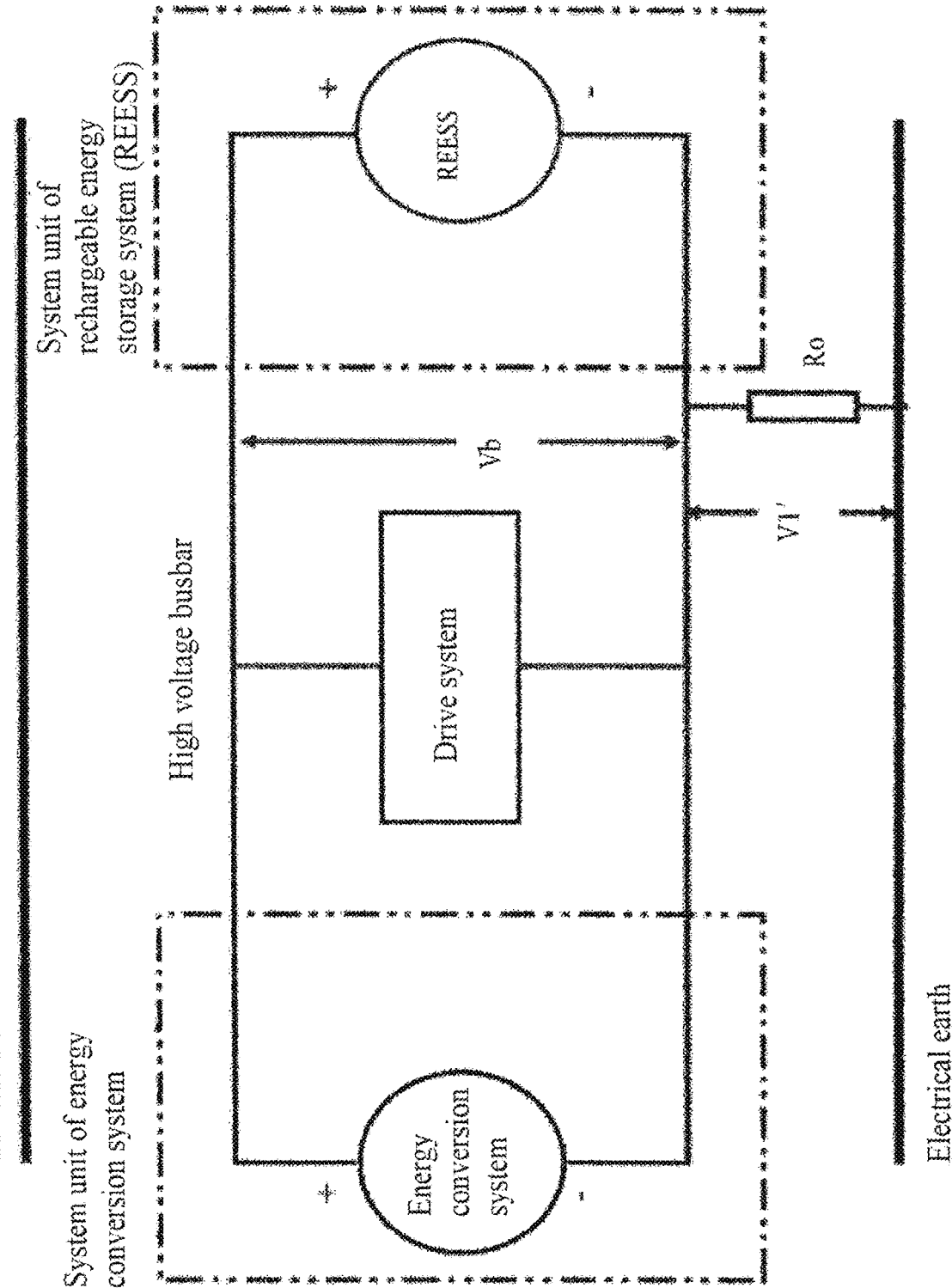
Figure 3:
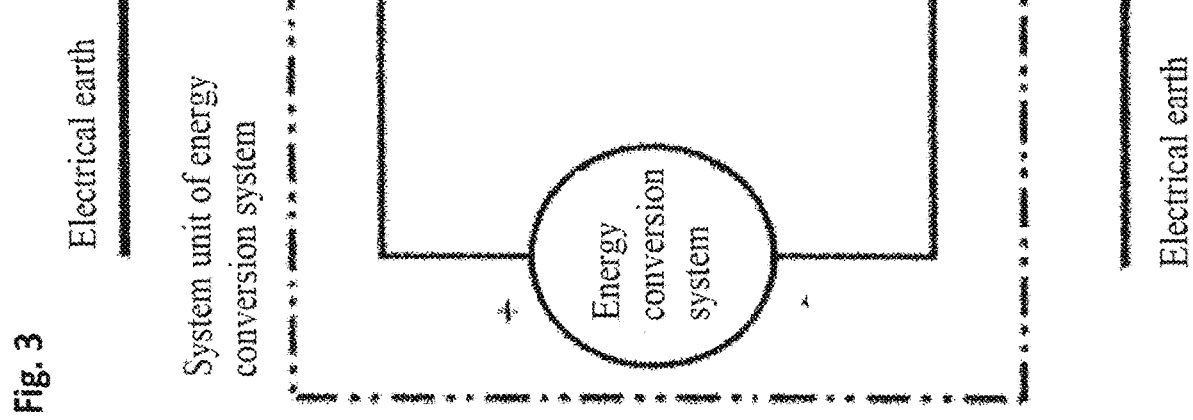

In this respect, the measuring circuit 22 exactly reproduces the measuring processes that are required for detecting the insulation resistance according to ECE R 100 according to FIGS. 1 to 3. The insulation resistance is calculated using the mathematical formulae specified in ECE R 100.

Since the measuring circuit 22 introduces circuit components $S_1$ and $S_2$, which were not provided in the original circuit according to ECE R 100 according to FIGS. 1 to 3, the aim of the invention is to further develop the circuit in such a way that any errors that could arise from these additional components can be recognized in timely manner and, optionally, react to them.

According to the invention, the current flows are theoretically calculated in conjunction with the above-mentioned voltage measurement and are also recorded in practice using a current measuring device 24.

The theoretical current values It1 and It2 can be easily calculated using the formulae It1=$U_P/R_S$ and It2=$U_M/R_S$ from the determined voltage values $U_P$, $U_M$ and the value of the comparator resistors $R_S$.

In addition, according to the invention, during the above alternating detection of the two voltages $U_P$ and $U_M$ via the two comparator resistors $R_S$, the current actually flowing $I_{G1}$, $I_{G2}$ is determined by means of the current measuring device 24.

When $S_1$ is closed, the measured current $I_{G1}$ must match It1. The same applies to $S_2$, $I_{G2}$ and It2. If the measured current $I_{G1}$, $I_{G2}$ deviates too severely from the desired value It1, It2, a defect in the switch $S_1$, $S_2$ or the measuring resistor $R_S$ can be assumed.

A defect in the switch could be:
Switch does not close→switch is non-conductive
A too-high leakage current flows through the switch (predominantly in the case of semiconductor switches)
Switch does not switch off→switch is always conducting
A defect in the resistor could be:
Resistance drift upwards→higher resistance
Resistance drift downwards→lower resistance
Resistance break→infinite resistance
Short circuit Furthermore, the result of the insulation measurement can be checked for plausibility by means of the current measurement (if it is sufficiently accurate).

Example

Battery voltage $U_B$=600 V
Comparator resistor $R_S$=1 MΩ.
First State: One Switch Activated If a switch is activated, a voltage across the side with the activated switch of $U_P$ or $U_M$ is established by the voltage divider ratio. The theoretical current It1/It2 across the activated switch $S_1/S_2$ is calculated from It1=$U_P/R_S$, It2=$U_M/R_S$, which represents the desired value of the expected measured current $I_{G1}/I_{G2}$.

If the measured current $I_{G1}/I_{G2}$ across the first/second switch $S_1/S_2$ plus all measurement inaccuracies (accuracy of the voltage measurement, accuracy of the current measurement, tolerance of the resistor $R_S$, temperature drift) is smaller than the desired value It1/It2, the following errors can be concluded:

Switch does not switch on
Resistance value of $R_S$ is too high (drift)
Resistor $R_S$ is high-resistance (break)

If the measured current $I_{G1}/I_{G2}$ minus all measurement inaccuracies (accuracy of voltage measurement, accuracy of current measurement, tolerance of resistor $R_S$, temperature drift) is greater than the desired value It1/It2, the following errors can be concluded:

Resistance value of $R_S$ is too low (drift)
Resistor $R_S$ is low-resistance (short circuit)
Second State: No Switch Activated If no switch is activated, minus the measurement inaccuracies (accuracy of the current measurement, leakage current of the semiconductor switches) no current should be measurable. If the measured current is still too high, it can be concluded that the leakage current of the semiconductor circuit is too high.

REFERENCE LIST

10 High voltage drive system,
12 HV battery
14 Drive
16 Positive busbar
18 Negative busbar
20 Earth-housing-vehicle chassis
22 Measuring circuit
24 Electricity meter
26a, b Voltage measuring device
$R_S$ Comparator resistor
$S_1$ First switch
$S_2$ Second switch
$U_P$ Voltage between positive busbar and earth
$U_M$ Voltage between negative busbar and earth
$R_{FP}$ Fault resistance between positive busbar and earth
$R_{FM}$ Fault resistance between negative busbar and earth
$I_{G1/2}$ Measured current
$U_B$ Operating voltage of the system

The invention claimed is:

1. A method for self-diagnosis of a circuit for measuring insulation resistance of a battery system, in particular in motor vehicles, which circuit comprises the following components: a first switch, which connects a positive terminal of the battery system to earth via a series-connected first comparator resistor ($R_S$) and a second switch, which connects a negative terminal of the battery system to earth via a series-connected second comparator resistor ($R_S$), in which method current measurements are carried out via the closed first switch to obtain a measured first current flow and via the closed second switch to obtain a measured second current flow, wherein at any one time only one of the first switch or the second switch is closed, wherein a theoretical current flow (It1, It2) via the switches is calculated on a basis of a voltage of the battery system and a size of the comparator resistor ($R_S$), in which method the measured current flow is compared with an associated theoretical current flow (It1, It2) and an error signal is output and/or an error action is carried out when a comparison result is above or below a predetermined reference value range.

2. The method according to claim 1, characterized in that an idle current measurement is carried out in which both switches are open, and that an error signal is output and/or an error action is carried out when the idle current exceeds a predetermined reference value.

3. The method according to claim 1, characterized in that the reference value range is selected such that temperature-related fluctuations of the measurement results or measurement value tolerances are taken into account.

4. The method according to claim 1, characterized in that if the measured current flow falls below the predetermined reference value range, the following errors are assumed:
The switch does not close correctly
The resistance value of $R_S$ is too large (drift)
The resistor $R_S$ is high-resistance (break).

5. The method according to claim 1, characterized in that if the measured current flow exceeds the predetermined reference value range, the following errors are assumed:
The resistance value of $R_S$ is too small (drift)
The resistor $R_S$ is low-resistance (short circuit).

6. The method according to claim 1, characterized in that a voltage difference ($U_P$) of the positive terminal of the battery system to earth as well as the voltage difference ($U_M$) of the negative terminal of the battery system to earth is measured and the theoretical current flow is calculated as follows:

$$It1 = U_P/R_S$$

$$It2 = U_M/R_S.$$

7. The method according to claim 1, characterized in that semiconductor switches are used as switches.

8. The method according to claim 1, characterized in that the values from a voltage measurement are fed to an AD converter and the signals are processed digitally in a microcontroller.

* * * * *